M. M. DESSAU.
APPARATUS FOR SHAPING PLASTIC MATERIAL SUCH AS INDIA RUBBER, GUTTA PERCHA, AND THE LIKE.
APPLICATION FILED NOV. 11, 1910.

998,474.

Patented July 18, 1911.

2 SHEETS—SHEET 1.

M. M. DESSAU.
APPARATUS FOR SHAPING PLASTIC MATERIAL SUCH AS INDIA RUBBER, GUTTA PERCHA, AND THE LIKE.
APPLICATION FILED NOV. 11, 1910.

998,474.

Patented July 18, 1911.

2 SHEETS—SHEET 2.

Witnesses:
E. R. Pick
L. L. Burket

Inventor:
Morland M. Dessau
by Hubert Pick
atty

UNITED STATES PATENT OFFICE.

MORLAND MICHOLL DESSAU, OF LONDON, ENGLAND.

APPARATUS FOR SHAPING PLASTIC MATERIAL SUCH AS INDIA-RUBBER, GUTTA-PERCHA, AND THE LIKE.

998,474.  Specification of Letters Patent.  Patented July 18, 1911.

Application filed November 11, 1910. Serial No. 591,865.

*To all whom it may concern:*

Be it known that I, MORLAND MICHOLL DESSAU, a citizen of the United States of America, residing at London, England, have invented Improvements in Apparatus for Shaping Plastic Material such as India-Rubber, Gutta-Percha, and the Like, of which the following is a specification.

This invention relates to a machine for molding plastic material such as india rubber, gutta percha, balata or the like into predetermined shapes (hereinafter generically referred to as "rubber biscuits") and it has for its object to provide a simplified arrangement and combination of parts for making such biscuits in a rapid and economical manner, all as hereinafter set forth and claimed.

Figure 1:
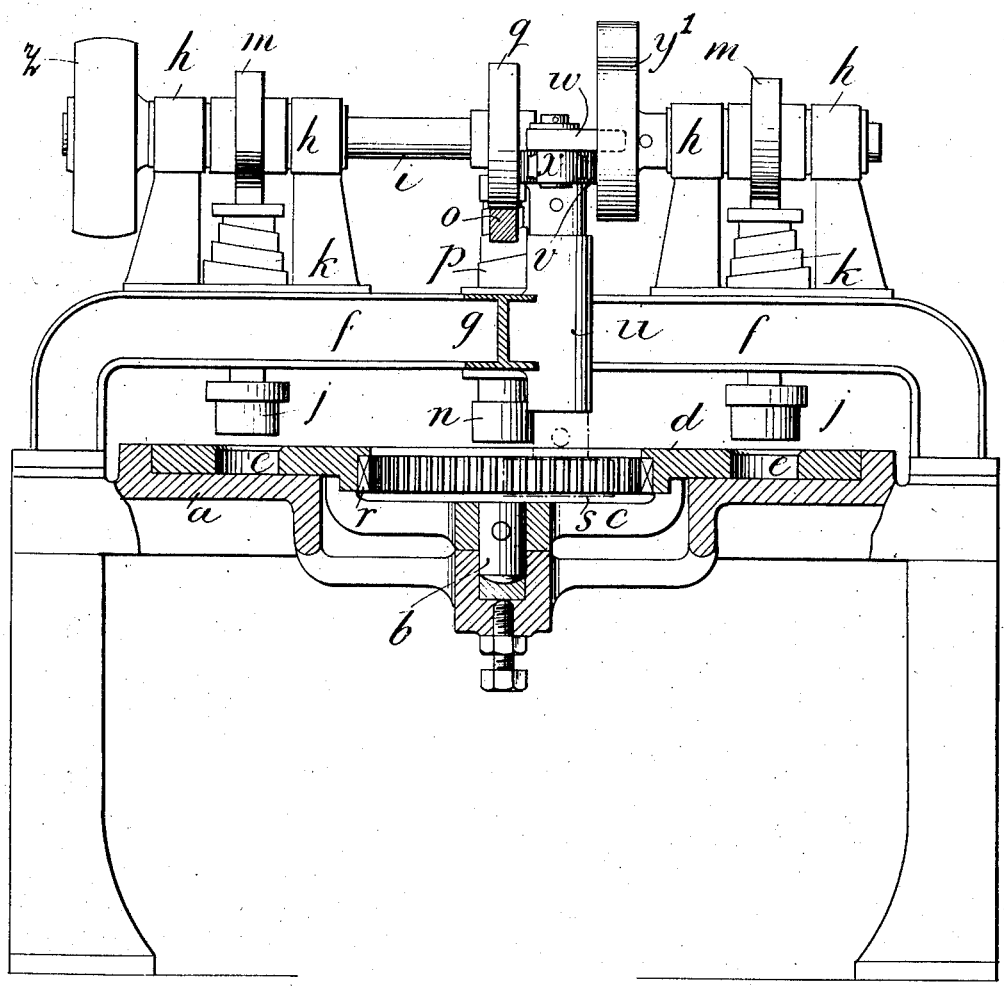
Figure 2:
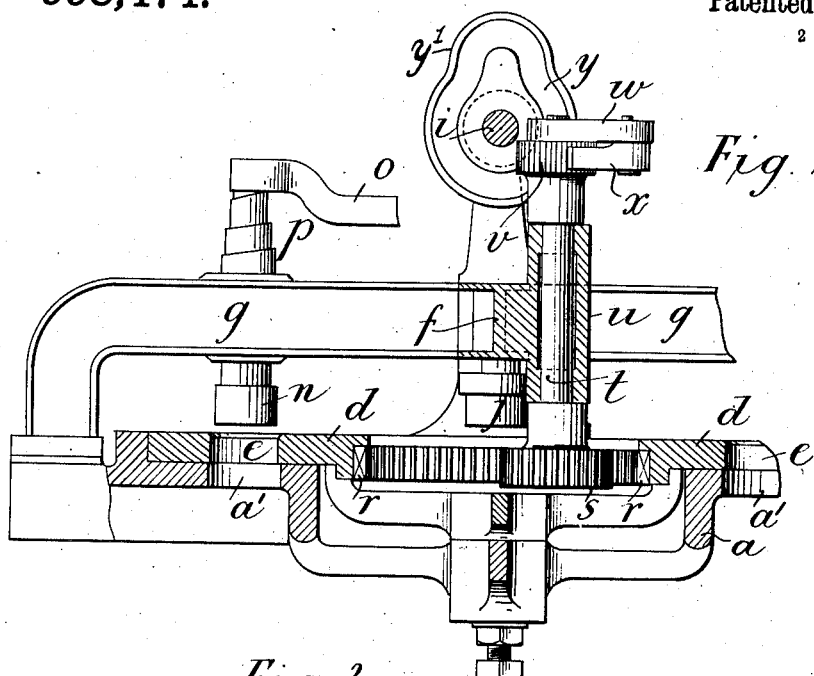
Figure 3:
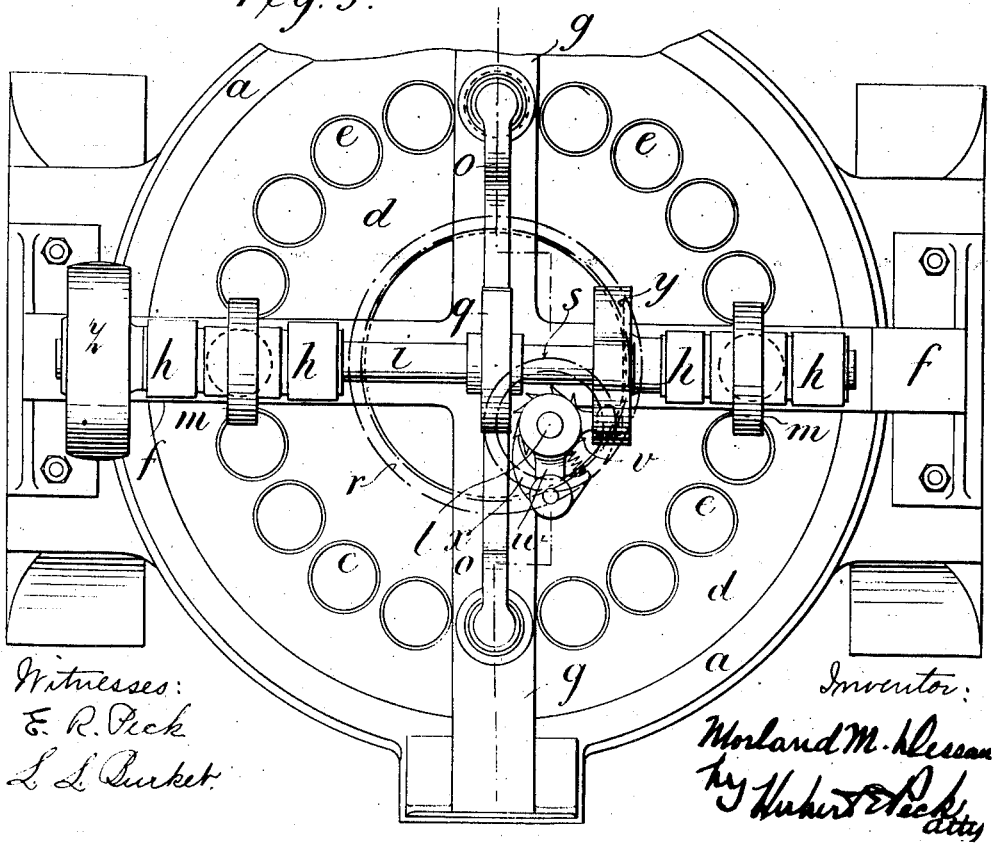

In the accompanying drawings, Figure 1 is a part sectional front elevation, Fig. 2 a part sectional side elevation and Fig. 3 a plan of the improved machine.

As there shown, $a$ is the stationary table having a central step bearing for a spindle $b$ whereon is carried, through a spider $c$, a rotary plate $d$ having mold apertures $e$ therein. By means of the said step bearing the plate $d$ can, as heretofore, be supported just clear of the table $a$ in order to reduce friction. Upon the table $a$ is mounted a spider comprising two arms $f$ arranged in alinement and at right angles to another pair of arms $g$. The arms $f$ serve as a support for bearings $h$ of a main driving shaft $i$ and also as a guide for a pair of compressing plungers $j$ which are adapted to be depressed against the opposing action of return springs $k$ by cams $m$. The arms $g$ serve as guides for a pair of ejecting plungers $n$ which are adapted to be forced downward through any corresponding pair of the apertures $e$ in the plate $d$ and discharge openings $a'$ in the table $a$ by a beam $o$ against the opposing action of return springs $p$. A cam $q$ on the driving shaft $i$ is adapted to operate the beam $o$ simultaneously with the operation of the plungers $j$ by the cams $m$. The rotary plate $d$ is formed with an internally toothed circular rack $r$ with which engages a spur gear $s$ upon the lower end of a spindle $t$ working in a bearing $u$ formed on the spider $f$ $g$. The upper end of the spindle $t$ is provided with a ratchet wheel $v$ and with a loosely moving bell crank lever $w$ having a pawl $x$, one arm of the said lever $w$ being engaged by the groove $y$ of a face cam $y'$ which is fixed on the shaft $i$ between the bearings $h$ and is designed to cause the pawl to operate the ratchet wheel through a single tooth distance at each revolution. The arrangement is such that material can be fed into the apertures $e$ in the plate $d$ at two points to be compressed and discharged at other points, the ratchet mechanism for rotating the plate $d$ being operative while the plungers $j$ $n$ are in their upper position and stationary.

$z$ is a wheel by which the shaft $i$ can be rotated from any suitable driving means.

What I claim is:—

1. A machine for making rubber biscuits, comprising a rotary plate having a series of apertures therein, a stationary table beneath such plate having a plurality of discharge openings in the path of the apertures in said plate, a carrier mounted upon said table, a plurality of ejecting plungers guided by said carrier and arranged to enter apertures in said plate and the discharge openings in said table, a cross member connected to and carrying said ejecting plungers, a plurality of compressing plungers guided by said carrier and adapted to compress plastic material in the apertures of the rotary plate against the table, springs arranged to move said plungers into their inoperative positions, a driving shaft, cams thereon for depressing said compressing plungers, a cam on said shaft for depressing said cross member with ejecting plungers, gearing for rotating said rotary plate, and a cam located between the bearings for said shaft for intermittently operating said gearing.

2. In a machine for making rubber biscuits, a stationary table, a rotary mold plate movable thereover, a shaft carrier mounted upon said table, a vertical spindle passing through said carrier, a spur gear at the lower end of such spindle, an interiorly toothed circular rack on the rotary plate engaged by said spur gear, a driving shaft mounted upon the carrier and a cam thereon, a ratchet wheel upon the upper end of the vertical spindle and a pawl governed by the cam for intermittently actuating the ratchet wheel.

3. In a machine for making rubber biscuits, a stationary table, a perforated rotary plate movable thereover, a four-armed spider carried by the table, a pair of compressing plungers passing through alternate arms of the spider, a pair of ejecting plungers passing through the remaining arms of the spider, a beam connecting the ejecting plungers, a driving shaft mounted above the compressing plungers, a circular rack on the rotary plate, a vertical spindle passing through the spider, a spur gear at the lower end of such spindle engaging the circular rack aforesaid, a ratchet wheel upon the upper end of the vertical spindle, a lever having a pawl engaging the ratchet wheel and cams upon the driving shaft arranged to respectively operate the compressing plungers, the beam of the ejecting plungers and the pawl operating lever.

Signed at London England this 17th day of October 1910.

MORLAND MICHOLL DESSAU.

Witnesses:
 HUGH HUGHES,
 CHARLES COPS.